United States Patent
Shimizu et al.

(10) Patent No.: US 8,413,783 B2
(45) Date of Patent: Apr. 9, 2013

(54) POWER TRANSMISSION DEVICE AND VEHICLE HAVING THE SAME

(75) Inventors: Tetsuya Shimizu, Anjo (JP); Kazuhiko Kato, Kariya (JP); Naoyuki Fukaya, Okazaki (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 620 days.

(21) Appl. No.: 12/654,623

(22) Filed: Dec. 28, 2009

(65) Prior Publication Data

US 2010/0193313 A1 Aug. 5, 2010

(30) Foreign Application Priority Data

Jan. 30, 2009 (JP) ................................ 2009-020734

(51) Int. Cl.
*F04B 49/00* (2006.01)
*F16D 25/12* (2006.01)

(52) U.S. Cl.
USPC ......... 192/85.63; 417/286; 477/130; 477/158

(58) Field of Classification Search .................. 475/101, 475/137; 192/85.63; 417/286; 477/130, 477/158
See application file for complete search history.

(56) References Cited

U.S. PATENT DOCUMENTS

| 7,163,481 B2 * | 1/2007 | Takagi et al. ................. 475/101 |
| 2010/0163360 A1 * | 7/2010 | Fujii et al. ..................... 192/3.33 |
| 2010/0181159 A1 * | 7/2010 | Shimizu et al. ............ 192/85.63 |
| 2010/0193315 A1 * | 8/2010 | Shimizu et al. ............ 192/85.63 |
| 2011/0088990 A1 * | 4/2011 | Shimizu et al. ............ 192/85.01 |

FOREIGN PATENT DOCUMENTS

| JP | A 2000-46166 | 2/2000 |
| JP | A 2002-21993 | 1/2002 |
| JP | A 2002-195399 | 7/2002 |
| JP | A 2005-28643 | 10/2005 |
| JP | A-2008-180303 | 8/2008 |

OTHER PUBLICATIONS

International Search Report mailed Feb. 16, 2010 for PCT/JP2009/070846.

* cited by examiner

*Primary Examiner* — Justin Holmes
*Assistant Examiner* — Jacob S Scott
(74) *Attorney, Agent, or Firm* — Oliff & Berridge, PLC

(57) ABSTRACT

A power transmission device that includes a clutch that transmits power from a motor to an axle; a first pump that is driven by power from the motor to generate and output fluid pressure; a second pump that receives and is driven by a supply of electric power to generate and output fluid pressure; a line pressure generating valve that is operated by operation fluid input to an operation input port, and regulates fluid pressure output from the first pump to generate a line pressure for engaging the clutch; and a switching valve that switches between a first connection state and a second connection state.

6 Claims, 5 Drawing Sheets

| | | C1 | C2 | C3 | B1 | B2 | B3 | B4 | F1 | F2 | F3 |
|---|---|---|---|---|---|---|---|---|---|---|---|
| | P | | | | | | | | | | |
| | R | | | O | (O) | | | O | O | | |
| | N | | | | | | | | | | |
| D | 1st | O | | | | | | (O) | | | O |
| | 2nd | O | | | | (O) | O | | O | O | |
| | 3rd | O | | O | (O) | | ● | | O | | |
| | 4th | O | O | ● | | | ● | | | | |
| | 5th | | O | O | O | | ● | | | | |

(O): ENGINE BRAKE IN OPERATION
●: ENGAGED BUT NO TORQUE TRANSMITTED

POWER TRANSMISSION DEVICE AND VEHICLE HAVING THE SAME

INCORPORATION BY REFERENCE

The disclosure of Japanese Patent Application No. 2009-020734 filed on Jan. 30, 2009 including the specification, drawings and abstract is incorporated herein by reference in its entirety.

BACKGROUND

The present invention relates to a power transmission device that is installed in a vehicle and provided with a clutch that transmits power from a motor to an axle, and a vehicle having the power transmission device.

This type of power transmission device conventionally has a first hydraulic pump (mechanical oil pump) that drives based on power from an engine; a pressure control valve that controls the force of hydraulic pressure discharged from the first hydraulic pump; a manual shift valve that operates in association with a shift operation; a solenoid valve whose input port is connected to the first hydraulic pump through the manual shift valve; a selector valve that is formed as a two-position electromagnetic valve (and includes a check valve), wherein at a first position the selector valve communicates with an oil passage that is interposed between and connects an output port of the solenoid valve to a friction engaging device (clutch) and at a second position the selector valve cuts off this oil passage; and a second hydraulic pump (electromagnetic pump) that directly delivers discharge pressure to the clutch. (See Japanese Patent Application Publication No. JP-A-2008-180303 for an example.) The proposed device can purportedly reduce energy loss and save energy by delivering pressure oil from the first hydraulic pump through the selector valve during operation of the friction engaging device, which requires a large volume of high-pressure oil, and by delivering pressure oil from the second hydraulic pump when holding this device at a predetermined pressure.

SUMMARY

By using an electromagnetic pump as an auxiliary pump in this manner, the power transmission device can save energy while also fulfilling its function as a power transmission device. However, considering that the power transmission device is installed in a vehicle, the device should be downsized as much as possible due to limited installation space.

The power transmission device and the vehicle having the same of the present invention fully exploit the device's capabilities while also downsizing the device.

The power transmission device and the vehicle having the same of the present invention employ the following to achieve the above.

A power transmission device of the present invention is installed in a vehicle. The power transmission device includes: a clutch that transmits power from a motor to an axle; a first pump that is driven by power from the motor to generate and output fluid pressure; a second pump that receives and is driven by a supply of electric power to generate and output fluid pressure; a line pressure generating valve that is operated by operation fluid input to an operation input port, and regulates fluid pressure output from the first pump to generate a line pressure for engaging the clutch; and a switching valve that switches between a first connection state, wherein when the first pump is driving, operation fluid output from the second pump is supplied to the operation input port of the line pressure generating valve and a supply of operation fluid from the second pump to the clutch is cut off, and a second connection state wherein, when the first pump is not driving, operation fluid output from the second pump is supplied to the clutch and the supply of operation fluid from the second pump to the operation input port of the line pressure generating valve is cut off.

According to the power transmission device of the present invention, the line pressure generating valve, which operates by operation fluid input to the operation input port, regulates fluid pressure output from the first pump, which is driven by power from the motor, to generate the line pressure for engaging the clutch. The switching valve switches between the first and second connection states. In the first connection state, when the first pump is driving, operation fluid output from the second pump is supplied to the operation input port of the line pressure generating valve and a supply of operation fluid from the second pump to the clutch is cut off. In the second connection state, when the first pump is not driving, operation fluid output from the second pump is supplied to the clutch and the supply of operation fluid from the second pump to the operation input port of the line pressure generating valve is cut off. Thus, the second pump can be used to supply fluid pressure to the clutch while the motor is stopped, and also supply operation fluid to the operation input port of the line pressure generating valve while the motor is driving. Therefore, a more downsized device can be achieved in comparison with one that separately provides a pressure regulating valve for operating the line pressure generating valve and a pump for applying fluid pressure to the clutch while the motor is stopped. By driving the second pump while the first pump is stopped in connection with stopping of the motor, fluid pressure from the second pump acts on the clutch. Therefore, when the motor subsequently restarts, the clutch can be rapidly engaged. Here, in addition to including an internal combustion engine capable of an automatic stop and an automatic start, the term "motor" also includes an electric motor capable of power output for travel. In addition to including an ordinary clutch that connects two rotating systems, the term "clutch" includes a brake that connects one rotating system to a fixing system such as a case. The term "second pump" includes an ordinary electric pump that is driven by power from an electric motor to generate fluid pressure, as well as an electromagnetic pump or the like that generates fluid pressure by reciprocating a mobile part using electromagnetic force or the biasing force of a spring.

The power transmission device of the present invention as described above may further include a linear solenoid capable of regulating by direct driving of a valve using electromagnetic force and supplying the line pressure generated by the line pressure generating valve to the clutch. The type of linear solenoid valve that directly drives a pressure regulating valve by electromagnetic force generally has relatively highly precise pressure regulation, compared to one that uses a relay valve to selectively switch between the line pressure and a hydraulic pressure regulated by a control valve. Therefore, the line pressure generating valve is not required to have a high degree of precision for pressure regulation; an ability to perform a constant pressure control with multiple stages is sufficient. Consequently, the second pump can be designed with emphasis placed on the function of supplying fluid pressure to the clutch. In the power transmission device of the present invention according to this mode, the switching valve may include: a signal pressure input port that is input with operation fluid at the line pressure generated by the line pressure generating valve; a first input port that is input with operation fluid regulated by the linear solenoid valve; a second input port that is input with operation fluid output from the second pump; a first output port that outputs operation fluid to the clutch; and a second output port that outputs operation fluid to the operation input port of the line pressure generating valve. When fluid pressure is input to the signal pressure input port, as the first connection state, the second input port communicates with the second output port, communication between the second input port and the first output port is cut off, and the first input port communicates with the first output port. When fluid pressure is not input to the signal pressure input port, as the second connection state, the second input port communicates with the first output port, communication between the second input port and the second output port is cut off, and communication between the first input port and the first output port is cut off.

A vehicle of the present invention is installed with a motor and a power transmission device of the present invention of any of the modes described above. Namely, the vehicle is basically installed with a power transmission device having a clutch that transmits power from the motor to an axle. The power transmission device further includes: a first pump that is driven by power from the motor to generate and output fluid pressure; a second pump that receives and is driven by a supply of electric power to generate and output fluid pressure; a line pressure generating valve that is operated by operation fluid input to an operation input port, and regulates fluid pressure output from the first pump to generate a line pressure for engaging the clutch; and a switching valve that switches between a first connection state, wherein when the first pump is driving, operation fluid output from the second pump is supplied to the operation input port of the line pressure generating valve and a supply of operation fluid from the second pump to the clutch is cut off, and a second connection state wherein, when the first pump is not driving, operation fluid output from the second pump is supplied to the clutch and the supply of operation fluid from the second pump to the operation input port of the line pressure generating valve is cut off.

The vehicle of the present invention is provided with the power transmission device of the present invention of any of the modes described above. Therefore, effects achieved by the power transmission of the present invention, for example, an effect of device downsizing and an effect of rapidly engaging the clutch at restarting of the motor after an automatic stop to swiftly start power transmission, can be achieved by the vehicle of the present invention.

DETAILED DESCRIPTION OF EMBODIMENTS

Next, an embodiment will be used to describe a best mode for carrying out the present invention.

Figure 1:
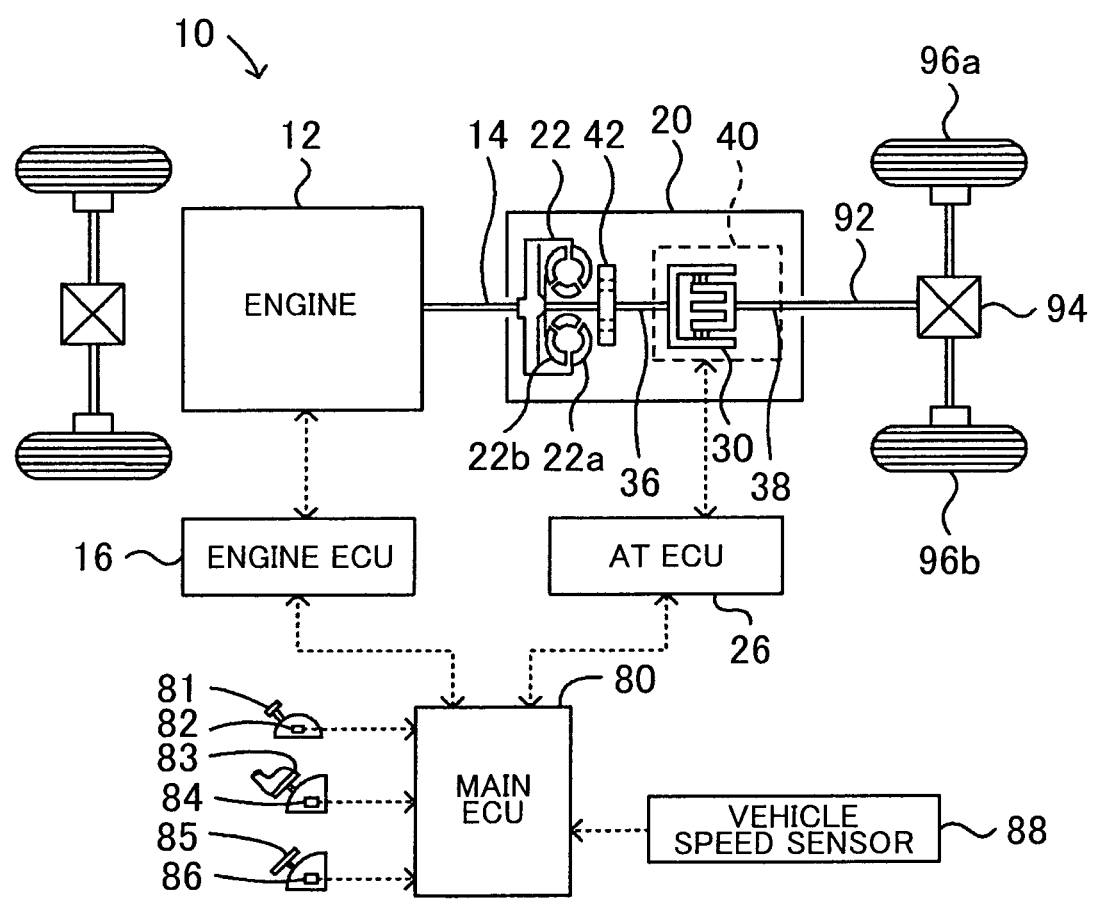
FIG. 1 is a structural diagram that shows an outline of the constitution of an automobile 10 incorporated with a power transmission device 20 serving as an embodiment of the present invention.
Figures 2, 3:
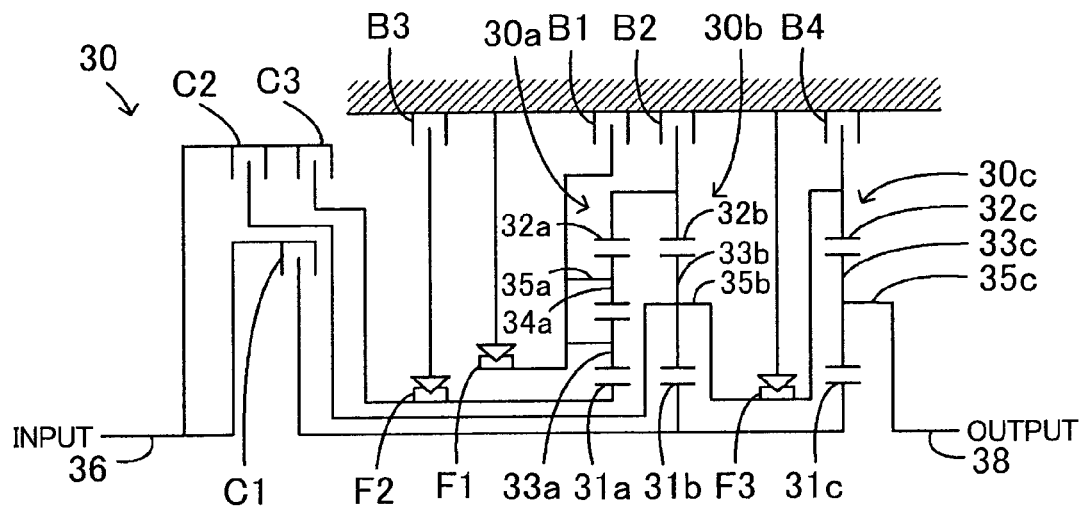
FIG. 2 is a structural diagram that shows an outline of the constitution of an automatic transmission 30 provided in the power transmission device 20 of the embodiment.
FIG. 3 is an explanatory drawing that shows an operation chart of the automatic transmission 30.
Figure 4:
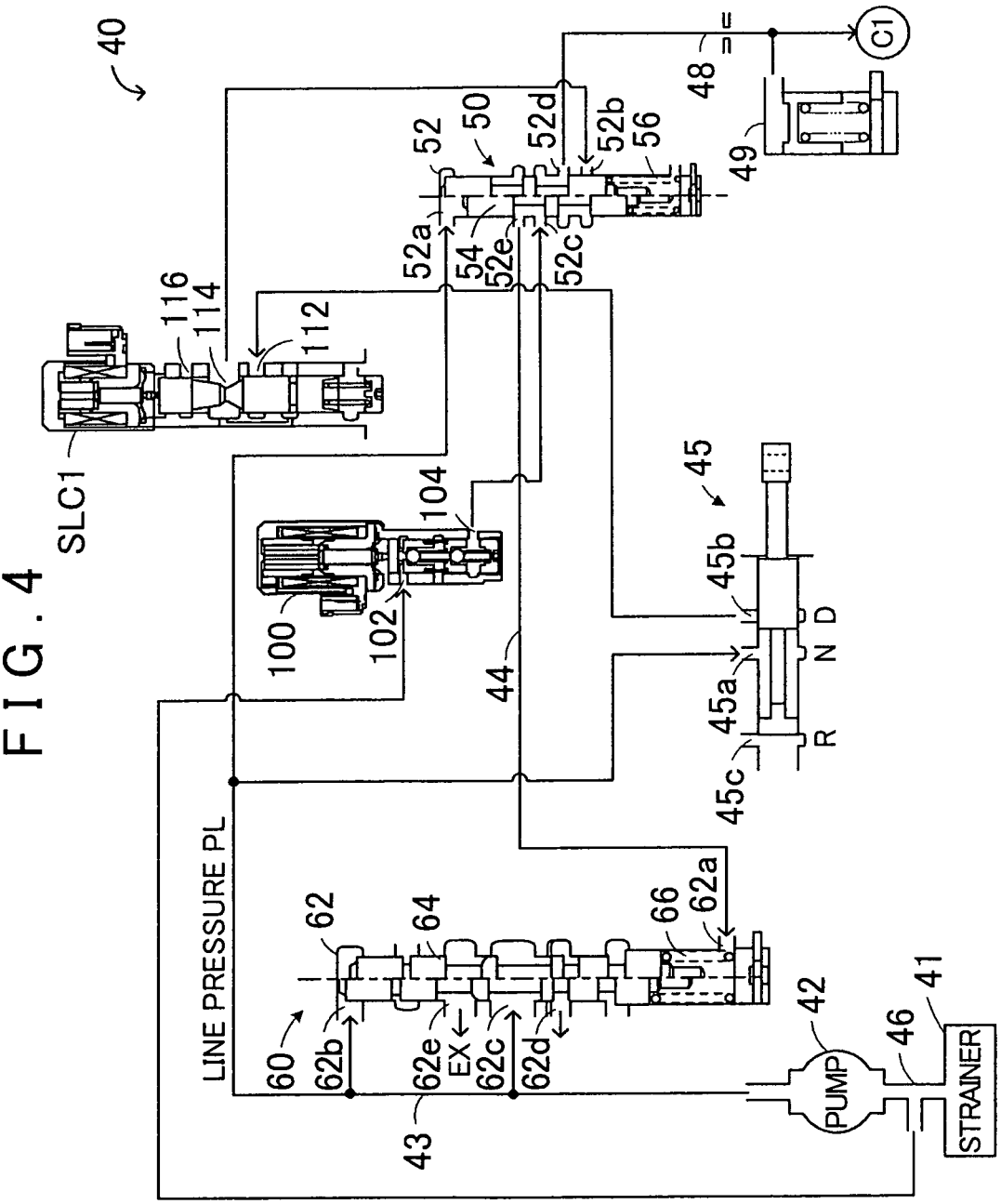
FIG. 4 is a structural diagram that shows an outline of the constitution of a hydraulic circuit 40.

FIG. 1 is a structural diagram that shows an outline of the constitution of an automobile 10 incorporated with a power transmission device 20 serving as an embodiment of the present invention. FIG. 2 is a structural diagram that shows an outline of the constitution of an automatic transmission 30 provided in the power transmission device 20. FIG. 3 is an explanatory drawing that shows an operation chart of the automatic transmission 30. FIG. 4 is a structural diagram that shows an outline of the constitution of a hydraulic circuit 40 that drives the automatic transmission 30.

As FIG. 1 shows, the automobile 10 of the present embodiment includes an engine 12, an engine electronic control unit (engine ECU) 16, and a power transmission device 20. The engine 12 is an internal combustion engine that outputs power by explosive combustion of a hydrocarbon fuel such as gasoline or diesel. The engine ECU 16 operates and controls the engine 12. The power transmission device 20 of the embodiment is connected to a crankshaft 14 of the engine 12, as well as to a drive shaft 92 connected to right and left wheels 96a, 96b through a differential gear 94, and transmits power from the engine 12 to the drive shaft 92.

As FIG. 1 further shows, the power transmission device 20 of the embodiment is formed as a transaxle device that transmits power from the engine 12 to the drive shaft 92, and includes a torque converter 22, a mechanical oil pump 42, the automatic transmission 30, the hydraulic circuit 40, an automatic transmission electronic control unit (AT ECU) 26, and a main electronic control unit (main ECU) 80. The torque converter 22 has a lock-up clutch and is formed from a pump impeller 22a, which is connected to the crankshaft 14 of the engine 12, and a turbine runner 22b, which is connected to an input shaft 36 of the automatic transmission 30 and disposed facing the pump impeller 22a. The mechanical oil pump 42 is disposed downstream of the torque converter 22 and pressure feeds operation oil based on the power from the engine 12. The automatic transmission 30 is staged and driven by hydraulic pressure. In addition, the automatic transmission 30 has the input shaft 36 connected to the turbine runner 22b of the torque converter 22 and an output shaft 38 that is connected to the drive shaft 92. The automatic transmission changes the speed of power input to the input shaft 36, which it then outputs to the output shaft 38. The hydraulic circuit 40 is an actuator that drives the automatic transmission 30. The AT ECU 26 controls the automatic transmission 30 (hydraulic circuit 40). The main electronic control unit 80 controls the vehicle overall. Note that the main electronic control unit 80 is input with a shift position SP from a shift position sensor 82 that detects an operation position of a shift lever 81; and accelerator opening Acc from an accelerator pedal position sensor 84 that detects a depression amount of an accelerator pedal 83; a brake switch signal BSW from a brake switch 86 that detects depression of a brake pedal 85; and a vehicle speed V from a vehicle speed sensor 88. The main electronic control unit 80 is also connected to the engine ECU 16 and the AT ECU 26 through communication ports, and exchanges various control signals and data with the engine ECU 16 and the AT ECU 26.

As shown in FIG. 2, the automatic transmission 30 has a double-pinion type planetary gear mechanism 30a; two single-pinion type planetary gear mechanisms 30b, 30c; three clutches C1, C2, C3; four brakes B1, B2, B3, B4; and three one-way clutches F1, F2, F3. The double-pinion type planetary gear mechanism 30a has a sun gear 31a with external teeth; a ring gear 32a with internal teeth that is disposed concentrically with respect to the sun gear 31a; a plurality of first pinion gears 33a that mesh with the sun gear 31a; a plurality of second pinion gears 34a that mesh with the plurality of first pinion gears 33a and also mesh with the ring gear 32a; and a carrier 35a that is connected to and also rotatably and revolvably holds the plurality of first pinion gears 33a and the plurality of second pinion gears 34a. The sun gear 31a is connected to the input shaft 36 through the clutch C3. The sun gear 31a is also connected to the brake B3 through the one-way clutch F2, and the rotation of the sun gear 31a is permitted or held stationary by engaging and disengaging the brake B3. The rotation of the ring gear 32a is permitted or held stationary by engaging and disengaging the brake B2. The carrier 35a is restricted to rotation in one direction by the one-way clutch F1, and the rotation of the carrier 35a is permitted or held stationary by engaging and disengaging the brake B1. The single-pinion type planetary gear mechanism 30b has a sun gear 31b with external teeth; a ring gear 32b with internal teeth that is disposed concentrically with respect to the sun gear 31b; a plurality of pinion gears 33b that mesh with the sun gear 31b and the ring gear 32b; and a carrier 35b that rotatably and revolvably holds the plurality of pinion gears 33b. The sun gear 31b is connected to the input shaft 36 through the clutch C1. The ring gear 32b is connected to the ring gear 32a of the double-pinion type planetary gear mechanism 30a, and the rotation of the ring gear 32b is permitted or held stationary by engaging and disengaging the brake B2. The carrier 35b is connected to the input shaft 36 through the clutch C2, and the carrier 35b is restricted to rotation in one direction by the one-way clutch F3. The single-pinion type planetary gear mechanism 30c has a sun gear 31c with external teeth; a ring gear 32c with internal teeth that is disposed concentrically with respect to the sun gear 31c; a plurality of pinion gears 33c that mesh with the sun gear 31c and the ring gear 32c; and a carrier 35c that rotatably and revolvably holds the plurality of pinion gears 33c. The sun gear 31c is connected to the sun gear 31b of the single-pinion type planetary gear mechanism 30b. The ring gear 32c is connected to the carrier 35b of the single-pinion type planetary gear mechanism 30b, and the rotation of the ring gear 32c is permitted or held stationary by engaging and disengaging the brake B4. The carrier 35c is connected to the output shaft 38.

As shown in FIG. 3, the automatic transmission 30 can switch among first to fifth forward speeds, one reverse speed, and neutral by engaging and disengaging the clutches C1 to C3 and the brakes B1 to B4. The first forward speed, namely the state of decelerating the rotation of the input shaft 36 at the largest reduction ratio and transmitting such rotation to the output shaft 38, is formed by engaging the clutch C1, and disengaging the clutches C2, C3 and the brakes B1 to B4. In the first forward speed, the brake B4 is engaged during engine braking. The second forward speed is formed by engaging the clutch C1 and the brake B3, and disengaging the clutches C2, C3 and the brakes B1, B2, B4. In the second forward speed, the brake B2 is engaged during engine braking. The third forward speed is formed by engaging the clutches C1, C3 and the brake B3, and disengaging the clutch C2 and the brakes B1, B2, B4. In the third forward speed, the brake B1 is engaged during engine braking. The fourth forward speed is formed by engaging the clutches C1 to C3 and the brake B3, and disengaging the brakes B1, B2, B4. The fifth forward speed, namely the state of decelerating (accelerating) the rotation of the input shaft 36 at the smallest reduction ratio and transmitting such rotation to the output shaft 38, is formed by engaging the clutches C2, C3 and the brakes B1, B3, and disengaging the clutch C1 and the brakes B2, B4. Neutral in the automatic transmission 30, namely the state of uncoupling the input shaft 36 and the output shaft 38, is achieved by disengaging all the clutches C1 to C3 and the brakes B1 to B4. The reverse speed is formed by engaging the clutch C3 and the brake B4, and disengaging the clutches C1, C2 and the brakes B1 to B3.

Engaging and disengaging of the clutches C1 to C3 and the brakes B1 to B4 of the automatic transmission 30 is performed by the hydraulic circuit 40. As shown in FIG. 4, the hydraulic circuit 40 includes: a regulator valve 60, a manual valve 45, a linear solenoid SLC1, an electromagnetic pump 100, a switching valve 50, and an accumulator 49. The regulator valve 60 regulates the pressure (a line pressure PL) of operation oil pressure fed from the mechanical oil pump 42, which is driven by power from the engine 12, through a strainer 41. The manual valve 45 is formed with an input port 45a that is input with the line pressure PL, a Drive-position (D-position) output port 45b, and a Reverse-position (R-position) output port 45c, and the like. The manual valve 45 opens and closes each port in association with the operation of the shift lever 81. The linear solenoid SLC1 is input with operation oil that is output from the D-position output port 45b of the manual valve 45 through an input port 112. By discharging to a drain port 116, the linear solenoid SLC1 regulates the pressure of the operation oil and outputs the operation oil from an output port 114. The electromagnetic pump 100 intakes operation oil through an intake port 102 from an oil passage 46 between the strainer 41 and the mechanical oil pump 42, and discharges from a discharge port 104. The switching valve 50 switches between the following two states: a state in which operation oil output from the linear solenoid SLC1 is delivered to an oil passage 48 of the clutch C1, and operation oil from the discharge port 104 of the electromagnetic pump 100 is delivered to an oil passage 44 as a signal pressure for operating the regulator valve 60; and a state in which the supply of operation oil from the linear solenoid SLC1 to the oil passage 48 of the clutch C1 is cut off, and operation oil from the discharge port 104 is delivered to the oil passage 48 of the clutch C1. The accumulator 49 is linked to the oil passage 48 that is connected to the clutch C1, and accumulates hydraulic pressure that acts on the clutch C1. Here, the linear solenoid SLC1 is used as a linear solenoid valve for direct control, which can directly control the clutch C1 by regulating the line pressure PL input through the manual valve 45 to an optimal clutch pressure for engaging the clutch C1. Note that FIG. 4 only shows the hydraulic system of the clutch C1, and does not show the hydraulic systems for the other clutches C2, C3 or the brakes B1 to B4 because they are not central to the present invention. These hydraulic systems may be configured using common linear solenoids or the like.

The regulator valve 60 is formed from a sleeve 62, a spool 64 that slides in the axial direction inside the sleeve 62, and a spring 66 that biases the spool 64 in the axial direction. The sleeve 62 is formed with various ports: a signal pressure input port 62a that is input with a signal pressure; a feedback input port 62b that is connected to an oil passage 43, to which the line pressure PL is output by the mechanical oil pump 42, and input with the line pressure PL as a feedback pressure; an input port 62c that is connected to the oil passage 43; an output port 62d that is connected to an oil passage linked to a secondary regulator valve (not shown); and a drain port 62e. In the regulator valve 60, an oil amount output from the input port 62c through the output port 62d increases as the spool 64 moves downward in the figure. If the spool 64 moves further downward, operation oil is drained from the input port 62c through the drain port 62e, which lowers the hydraulic pressure from the mechanical oil pump 42 and regulates the line pressure. The spool 64 is biased upward in the figure by the spring force of the spring 66 and the hydraulic pressure acting on the signal pressure input port 62a, and biased downward in the figure by the line pressure PL acting on the feedback input port 62b. Therefore, the line pressure PL increases as the hydraulic pressure acting on the signal pressure input port 62a increases.

The switching valve 50 is formed from a sleeve 52, a spool 54 that slides in the axial direction inside the sleeve 52, and a spring 56 that biases the spool 54 in the axial direction. The sleeve 52 is formed with various ports: a signal pressure input port 52a that is input with the line pressure PL as a signal pressure; an input port 52b that is connected to the output port 114 of the linear solenoid SLC1; an input port 52c that is connected to the discharge port 104 of the electromagnetic pump 100; an output port 52d that is connected to the oil passage 48 of the clutch C1; and a drain port 52e that is connected to the oil passage 44 linked to the signal pressure input port 62a of the regulator valve 60. When the line pressure PL is input to the signal pressure input port 52a of the switching valve 50, the spool 54 overcomes the biasing force of the spring 56 to move to the position shown in the left-hand region of the figure. Consequently, communication between the input port 52c and the output port 52d is cut off, the input port 52b communicates with the output port 52d, and the input port 52c communicates with the output port 52e. Thus, the output port 114 of the linear solenoid SLC1 communicates with the oil passage 48 of the clutch C1, communication is cut off between the discharge port 104 of the electromagnetic pump 100 and the oil passage 48 of the clutch C1, and the discharge port 104 communicates with the oil passage 44 of the signal pressure input port 62a of the regulator valve 60. When the line pressure PL is not input to the signal pressure input port 52a, the biasing force of the spring 56 causes the spool 54 to move to the position shown in the right-hand region of the figure. Consequently, communication is cut off between the input port 52b and the output port 52d, the input port 52c communicates with the output port 52d, and communication is cut off between the input port 52c and the output port 52e. Thus, communication is cut off between the output port 114 of the linear solenoid SLC1 and the oil passage 48 of the clutch C1, the discharge port 104 of the electromagnetic pump 100 communicates with the oil passage 48 of the clutch C1, and communication is cut off between the discharge port 104 and the oil passage 44.

Furthermore, when the automobile 10 of the embodiment thus formed is running with the shift lever 81 in the Drive (D) running position, the engine 12 automatically stops when all preset automatic stop conditions are satisfied. Such automatic stop conditions include the vehicle speed V being zero, the accelerator off, and the brake switch signal BSW on. Once the engine 12 automatically stops, if preset automatic start conditions such as the brake switch signal BSW being off are subsequently satisfied, the automatically stopped engine 12 is automatically started.

When the automatic stop conditions are satisfied in the automobile 10 of the embodiment and the engine 12 automatically stops, the mechanical oil pump 42 also stops accordingly. Therefore, the line pressure PL escapes and the spool 54 of the switching valve 50 cuts off communication between the output port 114 of the linear solenoid SLC1 and the oil passage 48 of the clutch C1, and communicates the oil passage 48 of the clutch C1 with the discharge port 104 of the electromagnetic pump 100. Thus, pressure feeding operation oil from the electromagnetic pump 100 causes hydraulic pressure to act on the clutch C1. When the automatic start conditions are subsequently satisfied and the engine 12 automatically starts, the mechanical oil pump 42 also operates accordingly. Therefore, the line pressure PL is delivered and the spool 54 of the switching valve 50 communicates the output port 114 of the linear solenoid SLC1 with the oil passage 48 of the clutch C1, and cuts communication between the oil passage 48 of the clutch C1 and the discharge port 104 of the electromagnetic pump 100. In such case, the line pressure PL input through the D-position output port 45b of the manual valve 45 is regulated by the linear solenoid SLC1 and supplied to the clutch C1, such that the clutch C1 becomes completely engaged and starts the vehicle moving. By driving the electromagnetic pump 100 so that hydraulic pressure acts on the clutch C1 while the engine 12 is automatically stopped, the clutch C1 can be rapidly engaged by the linear solenoid SLC1 immediately after the engine 12 automatically restarts. Therefore, the vehicle can smoothly start off as the result of automatic starting of the engine 12. Note that in this embodiment, the electromagnetic pump 100 is set so as to pressure feed an amount of operation oil capable of replenishing only an amount of operation oil leakage from a seal ring or the like provided between the piston and drum of the clutch C1.

In the automobile 10 of the embodiment, the mechanical oil pump 42 operates based on power from the engine 12 while the engine 12 is running. Therefore, operation oil pressure fed from the mechanical oil pump 42 is used as the line pressure PL to engage the clutches C1 to C3 and the brakes B1 to B4. When the line pressure PL is input to the signal pressure input port 52a of the switching valve 50, the spool 54 of the switching valve 50 communicates the discharge port 104 of the electromagnetic pump 100 with the oil passage 44. Therefore, driving the electromagnetic pump 100 inputs operation oil as a signal pressure to the signal pressure input port 62a of the regulator valve 60 so as to enable adjustment of the line pressure PL. In this manner, while the engine 12 is operating, the electromagnetic pump 100 is driven so that a signal pressure can be input to the signal pressure input port 62a of the regulator valve 60. There is thus no need to provide a solenoid exclusively for inputting the signal pressure to the signal pressure input port 62a of the regulator valve 60, which enables downsizing of the device. Here, as described above, the discharge pressure of the electromagnetic pump 100 is set capable of replenishing only an amount of leakage from a seal ring or the like. In the embodiment, the same discharge pressure is set for input as the signal pressure to the signal pressure input port 62a of the regulator valve 60. Therefore, the regulator valve 60 can regulate the line pressure PL to two stages, high and low, for when the discharge pressure of the electromagnetic pump 100 is input and not input to the signal pressure input port 62a. However, this is dependent upon there being no need for the regulator valve 60 to steplessly (linearly) switch the setting of the line pressure PL or for such highly precise pressure regulation, because the linear solenoid SLC1 is structured as a linear solenoid valve for direct control that is capable of highly precise pressure regulation.

According to the power transmission device 20 of the embodiment described above, the discharge port 104 of the electromagnetic pump 100 is connected through the switching valve 50 to the oil passage 48 of the clutch C1 used for starting off and the oil passage 44 of the signal pressure input port 62a of the regulator valve 60. Consequently, a more downsized device can be achieved in comparison with one that separately provides a pressure regulating valve for driving the regulator valve 60 and an electromagnetic pump for supplying hydraulic pressure to the clutch C1 while the engine 12 is automatically stopped. In addition, the electromagnetic pump 100 is driven while the engine 12 is stopped so that hydraulic pressure from the electromagnetic pump 100 instead of the linear solenoid SLC1 acts on the clutch C1. Therefore, the clutch C1 can be rapidly engaged by the linear solenoid SLC1 immediately after the engine 12 restarts, and the vehicle can smoothly start off as the result of automatic starting of the engine 12.

In the power transmission device 20 of the embodiment, operation oil from the electromagnetic pump 100 is delivered to the signal pressure input port 62a of the regulator valve 60. However, operation oil may be delivered to a signal pressure input port of a secondary regulator valve (not shown), which regulates with a partial discharge the pressure of operation oil discharged from a primary regulator valve to generate a secondary pressure. In such case, operation oil may be supplied from the electromagnetic pump 100 to both the signal pressure input port of the primary regulator valve and the signal pressure input port of the secondary regulator valve.

In the power transmission device 20 of the embodiment, the output pressure delivered from the electromagnetic pump 100 to the signal pressure input port 62a of the regulator valve 60 is constant. However, the present invention is not limited to this example, and the output pressure may be regulated in any number of stages, such as three or five stages, and then output. Furthermore, the output pressure may be steplessly regulated with rougher accuracy than a linear solenoid for direct control.

Figure 5:
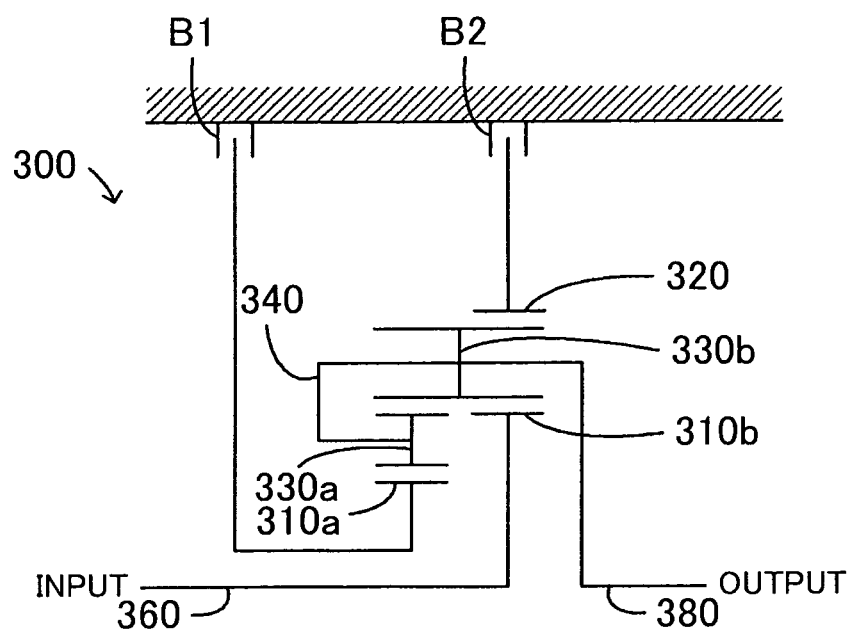
FIG. 5 is a structural diagram that shows an outline of the constitution of a transmission 300 provided in a power transmission device of a modification.
Figure 6:
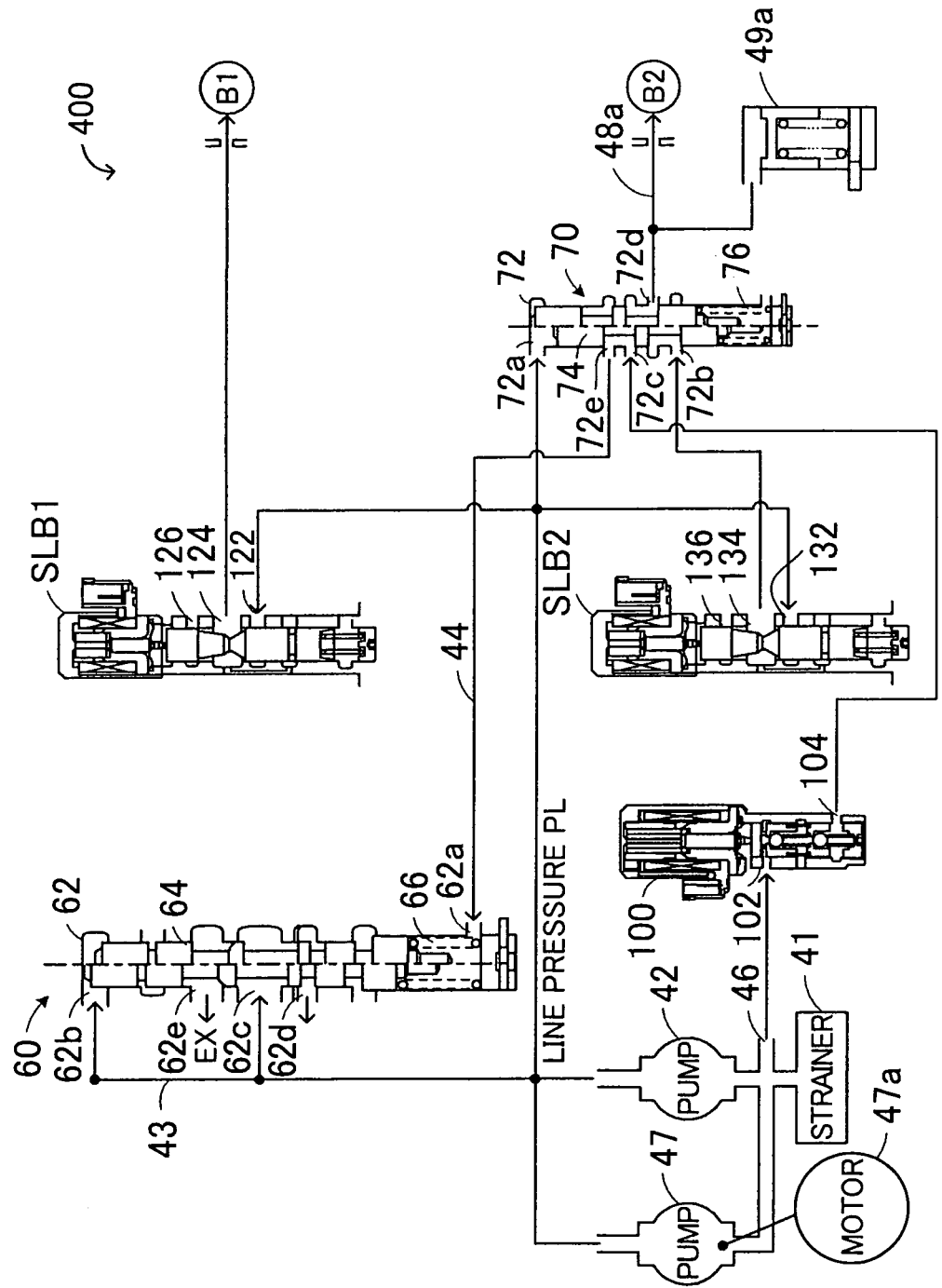
FIG. 6 is a structural diagram that shows an outline of the constitution of a hydraulic circuit 400.

The power transmission device 20 of the embodiment incorporates a five-speed automatic transmission 30 with first to fifth forward speeds. However, the present invention is not limited to this example, and the power transmission device 20 may incorporate an automatic transmission with any number of speeds, such as an automatic transmission with two to four speeds, or six or more speeds. A modification using a two-speed transmission will be described below. FIG. 5 is a structural diagram that shows an outline of the constitution of a transmission 300 provided in the power transmission device of the modification. FIG. 6 is a structural diagram that shows an outline of the constitution of a hydraulic circuit 400 that drives the transmission 300. As shown in FIG. 5, the transmission 300 is formed from a Ravigneaux type planetary gear mechanism and two brakes B1, B2. The Ravigneaux type planetary gear mechanism has two sun gears 310a, 310b with external teeth; a ring gear 320 with internal teeth; a plurality of short pinion gears 330a that mesh with the sun gear 310a; a plurality of long pinion gears 330b that mesh with the sun gear 310b and the plurality of short pinion gears 330a, and also mesh with the ring gear 320; and a carrier 340 that is connected to and also rotatably and revolvably holds the plurality of short pinion gears 330a and the plurality of long pinion gears 330b. The rotation of the sun gear 310a is permitted or held stationary by engaging and disengaging the brake B1. The sun gear 310b is connected to an input shaft 360. The rotation of the ring gear 320 is permitted or held stationary by engaging and disengaging the brake B2. The carrier 340 is connected to an output shaft 380. The transmission 300 has High and Low gear states. In the Low gear state, the brake B1 is disengaged and the brake B2 is engaged such that the rotation of the input shaft 360 is decelerated at a relatively large reduction ratio and output to the output shaft 380. In the High gear state, the brake B1 is engaged and the brake B2 is disengaged such that the rotation of the input shaft 360 is decelerated at a relatively small reduction ratio and output to the output shaft 380. In other words, the brake B2 in the transmission 300 is used as a clutch (brake) for starting off. The brakes B1, B2 are engaged and disengaged by hydraulic pressure from the hydraulic circuit 400 shown in FIG. 6. Note that FIG. 6 uses the same reference symbols for structures that are identical to those of the hydraulic circuit 40 shown in FIG. 4. In addition to having the mechanical oil pump 42, the regulator valve 60, and the electromagnetic pump 100 as in FIG. 4, the hydraulic circuit 400 further includes: an electric oil pump 47, a linear solenoid SLB1, a linear solenoid SLB2, a switching valve 70, and an accumulator 49a. The electric oil pump 47 is driven by a built-in electric motor 47a and pressure feeds operation through the strainer 41. The linear solenoid SLB1 is input with the line pressure PL through an input port 122. By discharging from a drain port 126, the linear solenoid SLB1 regulates the line pressure PL and outputs it from an output port 124 to the brake B1. The linear solenoid SLB2 is input with the line pressure PL through an input port 132. By discharging from a drain port 136, the linear solenoid SLB2 regulates the line pressure PL and outputs it from an output port 134 to the brake B2. The switching valve 70 switches between the following two states: a state in which operation oil output from the linear solenoid SLB2 is delivered to an oil passage 48a of the brake B2, and operation oil from the discharge port 104 of the electromagnetic pump 100 is delivered to the oil passage 44, which inputs such operation oil as a signal pressure to the regulator valve 60; and a state in which the supply of operation oil from the linear solenoid SLB2 to the oil passage 48a of the brake B2 is cut off, and operation oil from the discharge port 104 is delivered to the oil passage 48a of the brake B2. The accumulator 49a is linked to the oil passage 48a that is connected to the brake B2, and accumulates hydraulic pressure that acts on the brake B2.

The switching valve 70 is formed from a sleeve 72, a spool 74 that slides in the axial direction inside the sleeve 72, and a spring 76 that biases the spool 74 in the axial direction. The sleeve 72 is formed with various ports: a signal pressure input port 72a that is input with the line pressure PL as a signal pressure; an input port 72b that is connected to the output port 134 of the linear solenoid SLB2; an input port 72c that is connected to the discharge port 104 of the electromagnetic pump 100; an output port 72d that is connected to the oil passage 48a of the brake B2; and an output port 72e that is connected to the oil passage 44 linked to the signal pressure input port 62a of the regulator valve 60. When the line pressure PL is input to the signal pressure input port 72a of the switching valve 70, the spool 74 overcomes the biasing force of the spring 76 to move to the position shown in the left-hand region of the figure. Consequently, communication between the input port 72c and the output port 72d is cut off, the input port 72b communicates with the output port 72d, and the input port 72c communicates with the output port 72e. Thus, the output port 134 of the linear solenoid SLB2 communicates with the oil passage 48a of the brake B2, communication is cut off between the discharge port 104 of the electromagnetic pump 100 and the oil passage 48a of the brake B2, and the discharge port 104 communicates with the oil passage 44 of the signal pressure input port 62a of the regulator valve 60. When the line pressure PL is not input to the signal pressure input port 72a, the biasing force of the spring 76 causes the spool 74 to move to the position shown in the right-hand region of the figure. Consequently, communication is cut off between the input port 72b and the output port 72d, the input port 72c communicates with the output port 72d, and communication is cut off between the input port 72c and the output port 72e. Thus, communication is cut off between the output port 134 of the linear solenoid SLB2 and the oil passage 48a of the brake B2, the discharge port 104 of the electromagnetic pump 100 communicates with the oil passage 48a of the brake B2, and communication is cut off between the discharge port 104 and the oil passage 44. Thus, similar to the embodiment, the hydraulic circuit 400 of the modification can achieve a more downsized device in comparison with one that separately provides a pressure regulating valve for driving the regulator valve 60 and an electromagnetic pump for supplying hydraulic pressure to the brake B2 while the engine 12 is automatically stopped. By pressure feeding operation oil from the electromagnetic pump 100 to the brake B2 while the engine 12 is automatically stopped, the brake B2 can be rapidly engaged by the linear solenoid SLB2 immediately after the engine 12 automatically restarts so that the vehicle can smoothly start off. Note that although the hydraulic circuit 400 includes both the mechanical oil pump 42 and the electric oil pump 47, one of them may be omitted.

Here, the correspondence relation will be described between main elements in the embodiment and main elements of the invention as listed in the Summary of the Invention. In the embodiment, the engine 12 corresponds to a "motor"; the mechanical oil pump 42 to a "first pump"; the electromagnetic pump 100 to a "second pump"; the regulator valve 60 to a "line pressure generating valve"; and the switching valve 50 to a "switching valve". The signal pressure input port 62a of the regulator valve 60 corresponds to an "operation input port". Here, the motor is not limited to an internal combustion engine that outputs power using a hydrocarbon fuel such as gasoline or diesel. The motor may be any type of internal combustion engine, such as a hydrogen engine, or any type of motor capable of power output, such as an electric motor other than an internal combustion engine. The power transmission device incorporates the five-speed automatic transmission 30 with first to fifth forward speeds. However, the present invention is not limited to this example, and the power transmission device may incorporate an automatic transmission with any number of speeds, such as a two-speed, four-speed, six-speed, or eight-speed automatic transmission. The second pump is not limited to an electromagnetic pump that pressure feeds operation oil using electromagnetic force. The second pump may be any type of pump that is driven by electric power to generate fluid pressure, such as an electric pump that pressure feeds operation oil using power from an electric motor. In addition, the second pump is not limited to one that pressure feeds operation fluid to the clutch C1 which forms the first forward speed and the brake B2 which forms the Low gear state. For example, when a shift speed other than the first forward speed (such as the second forward speed) is set at start-off based on a driver instruction or the running condition, the second pump may pressure feed operation oil to a clutch or brake that forms this speed. Note that with regard to the correspondence relation between the main elements of the embodiment and the main elements of the invention as listed in the Summary of the Invention, the embodiment is only an example for giving a specific description of a best mode for carrying out the invention explained in the Summary of the Invention. This correspondence relation does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe a mode for carrying out the present invention. However, the present invention is not particularly limited to such an example, and may obviously be carried out using various embodiments without departing from the scope of the present invention.

The present invention may be used in the automobile industry and the like.

What is claimed is:

1. A power transmission device installed in a vehicle, comprising:

a clutch that transmits power from a motor to an axle;

a first pump that is driven by power from the motor to generate and output fluid pressure;

a second pump that receives and is driven by a supply of electric power to generate and output fluid pressure;

a line pressure generating valve that is operated by operation fluid input to an operation input port, and regulates fluid pressure output from the first pump to generate a line pressure for engaging the clutch; and a switching valve that switches between a first connection state, wherein when the first pump is driving, operation fluid output from the second pump is supplied to the operation input port of the line pressure generating valve and a supply of operation fluid from the second pump to the clutch is cut off, and a second connection state wherein, when the first pump is not driving, operation fluid output from the second pump is supplied to the clutch and the supply of operation fluid from the second pump to the operation input port of the line pressure generating valve is cut off.

2. The power transmission device according to claim 1, further comprising:

a linear solenoid capable of regulating by direct driving of a valve using electromagnetic force and supplying the line pressure generated by the line pressure generating valve to the clutch.

3. The power transmission device according to claim 2, wherein the switching valve comprises:

a signal pressure input port that is input with operation fluid at the line pressure generated by the line pressure generating valve;

a first input port that is input with operation fluid regulated by the linear solenoid valve;

a second input port that is input with operation fluid output from the second pump;

a first output port that outputs operation fluid to the clutch; and a second output port that outputs operation fluid to the operation input port of the line pressure generating valve, wherein when fluid pressure is input to the signal pressure input port, as the first connection state, the second input port communicates with the second output port, communication between the second input port and the first output port is cut off, and the first input port communicates with the first output port, and when fluid pressure is not input to the signal pressure input port, as the second connection state, the second input port communicates with the first output port, communication between the second input port and the second output port is cut off, and communication between the first input port and the first output port is cut off.

4. The power transmission device according to 1, wherein the second pump is an electromagnetic pump that generates fluid pressure using electromagnetic force.

5. The power transmission device according to claim 1, wherein the motor is an internal combustion engine capable of an automatic stop and an automatic start.

6. A vehicle provided with the motor, and the power transmission device according to claim 1.

* * * * *